(No Model.)

A. R. POWLEY.
BICYCLE BOAT.

No. 577,269.  Patented Feb. 16, 1897.

WITNESSES
C. Nordfors
C. Gerst

INVENTOR
Allan Reay Powley
BY
Edgar Tate & Co.
ATTORNEYS.

UNITED STATES PATENT OFFICE.

ALLAN RAY POWLEY, OF KINGSTON, NEW YORK, ASSIGNOR OF ONE-HALF TO BIRD H. BRAZELTON, OF CHICAGO, ILLINOIS.

BICYCLE-BOAT.

SPECIFICATION forming part of Letters Patent No. 577,269, dated February 16, 1897.

Application filed September 4, 1896. Serial No. 604,867. (No model.)

*To all whom it may concern:*

Be it known that I, ALLAN RAY POWLEY, a citizen of the United States, and a resident of Kingston, in the county of Ulster and State of New York, have invented certain new and useful Improvements in Boats, of which the following is a specification, reference being had to the accompanying drawings, forming a part thereof, in which similar numerals of reference indicate corresponding parts wherever found throughout both views.

This invention relates to small boats, and the object thereof is to provide improved means for propelling boats of this class, a further object being to provide what is known as a "bicycle-boat;" and with these and other objects in view the invention consists in the construction, combination, and arrangement of parts hereinafter described and claimed.

The invention is fully disclosed in the following specification, of which the accompanying drawings form a part, in which—

Figure 1:
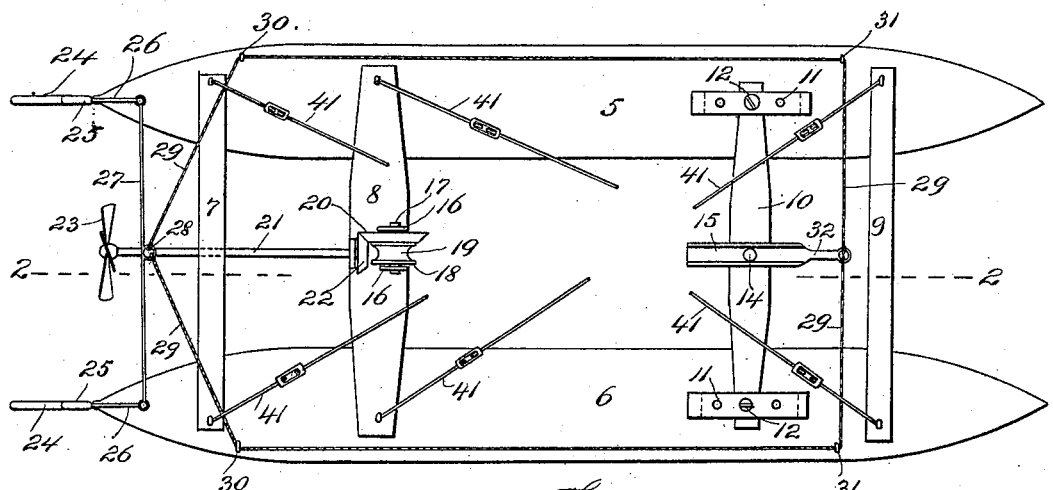
Figure 2:
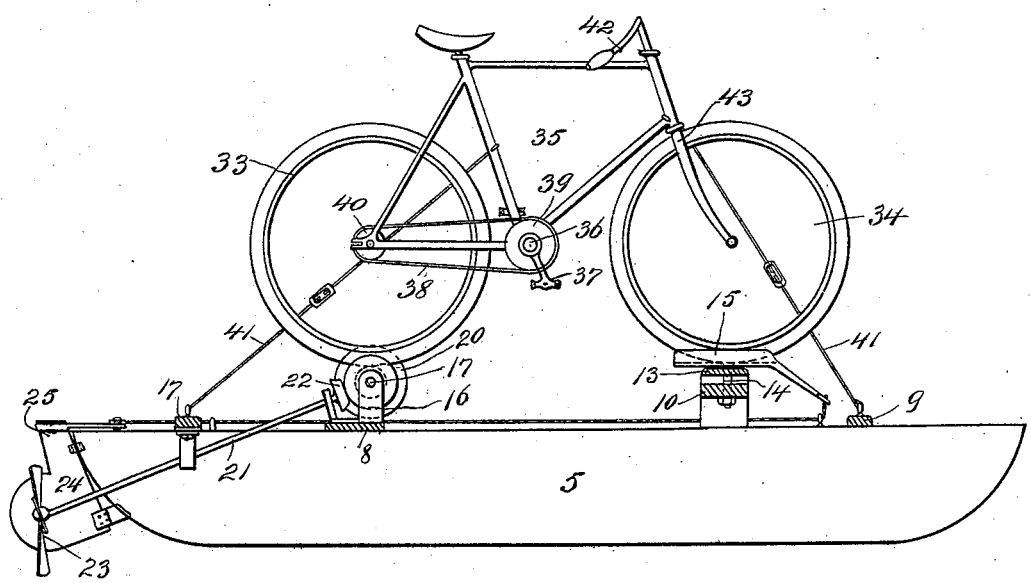

Figure 1 is a plan view of my improved boat with the bicycle by which the same is propelled removed; and Fig. 2, a longitudinal section on the line 2 2 thereof, showing the bicycle in position.

In the practice of my invention I provide two similar floats 5 and 6, said floats being of the shape or form of small canoes, and these floats are connected by transverse bars 7, 8, and 9, the bar 7 being arranged at or near the stern of the float, and the bar 9 at or near the front thereof. I also provide a cross-bar 10, which is mounted in keepers 11, one of which is secured to each of the floats, and said cross-bar 10 is preferably adjustable longitudinally of said float, and is held in any desired position by a set-screw 12, with which each of said keepers is provided. The transverse bar 10 is also preferably composed of two parts, as shown in Fig. 2, the upper part 13 being composed of spring material and mounted transversely of said bar 10, and secured to the upper part 13 thereof by a bolt 14, which passes therethrough, is a shoe 15, which is U-shaped in cross-section, and mounted in line therewith on the cross-bar 8 are standards 16, in which is mounted a shaft 17, on which is placed a friction-roller 18, provided with a peripheral groove 19, and secured to one side of said pulley is a beveled gear-wheel 20, and suitably mounted transversely and centrally of the cross-bars 7 and 8 is a shaft 21, which is provided at its upper end with a beveled gear-wheel 22, which operates in connection with the gear-wheel 20, and said shaft is carried downwardly and backwardly and provided at its rear end with a propeller 23, and the wheels 20 and 22 may be friction-wheels, if desired.

At the stern of each of the floats 5 and 6 is a rudder 24, which is hinged thereto or connected therewith in any desired manner, and each of said rudders is provided with an upwardly-directed arm 25, each of which is provided with a tiller 26, and said tillers are connected by a cross rope, cord, or chain 27, which is provided centrally with an eye or ring 28, with which are connected two side ropes or cords 29, which are carried outwardly and passed through pulleys or keepers 30, secured to the floats 5 and 6, and then forward along said floats and through other keepers or pulleys 31, and each of said cords or ropes 29 is then connected with a downwardly-directed arm 32, formed on the shoe 15.

Mounted on the friction-pulley 18 and the shoe 15 is an ordinary bicycle, the tire of the drive-wheel 33 of which rests in the groove of the pulley 18, and the guide-wheel 34 is similarly supported in the shoe 15.

The bicycle 35 is of the usual form and provided with a pedal-shaft 36, pedals 37, and a drive-chain 38, which is mounted on a sprocket 39, secured to the pedal-shaft, and a corresponding sprocket-wheel 40, secured to the shaft of the drive-wheel 33.

I also provide guy rods, ropes, or chains 41, three of which are employed on each side in the arrangement shown in Fig. 1, and said guy rods or chains are connected with the tops of the floats 5 and 6 or with the ends of the cross-bars 7, 8, and 9 and are adapted to be connected with the frame of the bicycle at any desired point or points, so as to firmly hold said bicycle in position, and the operation will be readily understood from the foregoing description when taken in connection with the accompanying drawings and the following statement thereof.

The floats being placed in the water and the bicycle secured in position, said bicycle is mounted in the usual manner, and the pedals thereof are also worked in the usual manner, and this operation revolves the drive-wheel, and said drive-wheel revolves the friction-roller 18, and this roller revolves the beveled gear-wheel 20, which in turn revolves the shaft 21, with which the propeller 23 is connected by means of the beveled gear-wheel 22, and this operation propels the boat, as will be readily understood.

The bicycle is provided with the usual handle-bar 42, which is connected with a yoke 43, in which the guide-wheel 34 is mounted, and by turning the handle-bar in the usual manner the guide-wheel 34 will be also turned and with it the shoe 15, and the turning of the shoe 15 will operate the cords or chains 29, and these cords or chains will operate the tillers 26, and the boat may thus be guided in any desired direction.

This device is simple in construction and operation and perfectly adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

1. A boat consisting of two similar floats, each of which is provided with a rudder, and are connected and held parallel to each other, by cross-bars, one of said cross-bars being provided with a friction-roller which is mounted thereon, and provided with a peripheral groove, said roller being provided at one side with a beveled gear-wheel, a suitably-supported propeller-shaft provided with a beveled gear-wheel which is adapted to be operated by the wheel on the roller, said roller being also adapted to support the drive-wheel of a bicycle, and a pivotally-mounted shoe by which the guide-wheel of the bicycle is supported, said shoe being provided with a downwardly-directed arm, with which are connected two cords or similar devices, which are passed through suitable keepers secured to the floats, and carried backwardly and connected with the tillers of the rudders, substantially as shown and described.

2. A boat consisting of two similar floats, each of which is provided with a rudder, and are connected and held parallel to each other by cross-bars, one of said cross-bars being provided with a friction-roller which is mounted thereon, and provided with a peripheral groove, said roller being provided at one side with a beveled gear-wheel, a suitably-supported propeller-shaft provided with a beveled gear-wheel which is adapted to be operated by the wheel on the roller, said roller being also adapted to support the drive-wheel of a bicycle, and a pivotally-mounted shoe by which the guide-wheel of the bicycle is supported, said shoe being provided with a downwardly-directed arm, with which are connected two cords or similar devices, which are passed through suitable keepers secured to the floats, and carried backwardly and connected with the tillers of the rudders, and means for holding a bicycle on said roller and said shoe, substantially as shown and described.

3. In a boat, the combination with two parallel floats which are connected as herein described, of a suitably-supported and peripherally-grooved roller, and also a suitably and pivotally supported shoe, said roller and said shoe being adapted to support the drive-wheel, and the guide-wheel of a bicycle respectively, a beveled gear-wheel mounted on said roller, a suitably-supported propeller-shaft provided with a beveled gear-wheel which is operated thereby, and means connected with said shoe for steering or guiding the boat by means of the handle-bar of the bicycle, substantially as shown and describd.

In testimony that I claim the foregoing as my invention I have signed my name, in presence of the subscribing witnesses, this 1st day of September, 1896.

ALLAN RAY POWLEY.

Witnesses:
WALTER N. GILL,
EMIL L. AARON.